W. FICZEK.
TROLLEY WHEEL MOUNT.
APPLICATION FILED DEC. 11, 1913.
1,094,890.
Patented Apr. 28, 1914.
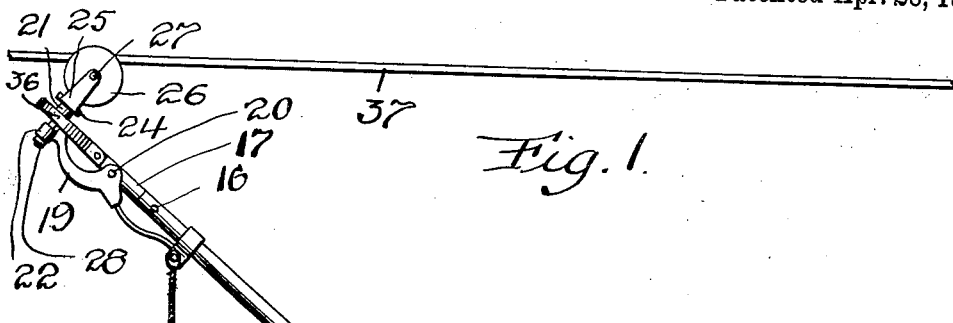
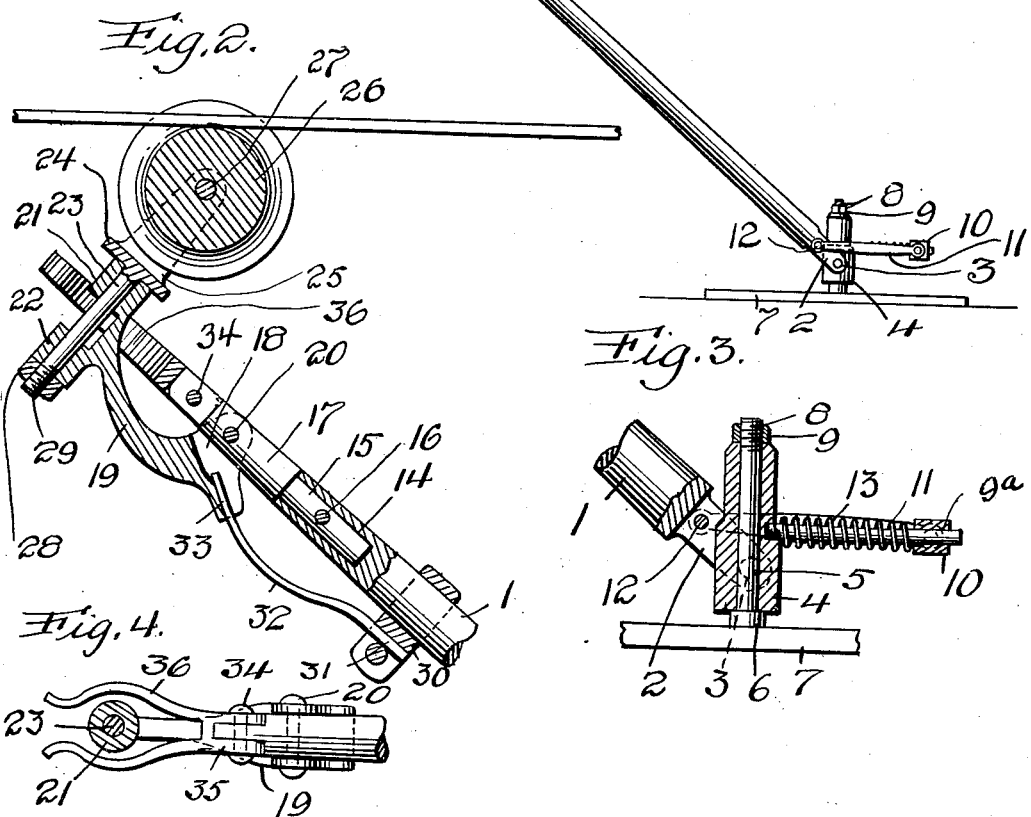
WITNESSES
INVENTOR
W. Ficzek.
Att'ys.

UNITED STATES PATENT OFFICE.

WIKTOR FICZEK, OF JERSEY CITY, NEW JERSEY.

TROLLEY-WHEEL MOUNT.

1,094,890.   Specification of Letters Patent.   Patented Apr. 28, 1914.

Application filed December 11, 1913. Serial No. 806,073.

*To all whom it may concern:*

Be it known that I, WIKTOR FICZEK, a subject of the Emperor of Austria-Hungary, residing at Jersey City, in the county of Hudson and State of New Jersey, have invented certain new and useful Improvements in Trolley-Wheel Mounts, of which the following is a specification, reference being had therein to the accompanying drawing.

This invention relates to a trolley wheel mount, and has for its object to provide a trolley, in a manner as hereinafter set forth, for maintaining the trolley wheel in engagement with the trolley wire, particularly when rounding a curve.

Further objects of the invention are to provide a trolley wheel mount which is simple in its construction and arrangement, strong, durable, efficient and convenient in its use, readily set up and comparatively inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—Figure 1 is a side elevation of a trolley wheel mount in accordance with this invention, showing the adaptation thereof in connection with a trolley wheel and wire, Fig. 2 is a sectional elevation showing a wheel mount maintaining the trolley wheel in engagement with the trolley wire, Fig. 3 is a sectional detail of the lower end of the trolley, and Fig. 4 is a plan, partly in section of the upper portion of the trolley.

Referring to the drawings in detail, 1 denotes a trolley pole having a bifurcated lower end 2, which is pivotally connected, as at 3 to a shiftable sleeve 4, mounted upon a stem 5, the latter having a shoulder 6 upon which the sleeve 4 rests. The stem 5 is fixed to a suitable support 7, the latter may be the roof of a car. The stem 5 is threaded as at 8, and engaging with the said threads is a nut 9 for maintaining the sleeve 4 upon the stem 5. Fixedly secured to the sleeve 4 and projecting laterally therefrom is an arm 9ª upon which is slidably mounted a head 10 and to each end of the head 10 is pivotally connected one end of an arm 11, the other end of the arm being pivotally connected as at 12 to one of the arms formed by the bifurcated lower end 2 of the pole 1. Surrounding the arm 9ª and interposed between the head 10 and the sleeve 4 is a coiled compression spring 13. The function of the spring 13 is to normally maintain the pole 1 rearwardly at an inclination.

The upper end of the pole 1 is provided with a socket 14, into which extends a stem 15, the latter being secured to the pole 1 by a transverse pin 16. The stem 14 projects from an extension 17, which forms a continuation of the pole 1. Straddling and pivotally connected to the stem 17 is a bifurcated lower end 18 of a curved supporting arm 19. The pivot for the arm 19 is indicated at 20. Formed integral with the upper end of the arm 19, is a pair of bearing collars 21, 22, for a stem 23. The latter depends from the base 24, of a harp 25, in which is arranged a trolley wheel 26, the shaft of the latter being journaled in the harp and indicated by the reference character 27. The stem 23 projects below the collar 22 and has its lower end threaded as at 28 and engaging with said threads is a nut 29, for limiting upward movement of the stem 23. The downward movement of the stem 23 is limited by the base 24. Connected with the upper portion of the pole 1 by the clamp 30 is the lower end 31 of a bow-shaped spring 32, the latter having its upper end extending into the bifurcated lower end of the supporting arm 19. The upper end of the spring 32 is indicated as at 33, and bears against the arm 19. The function of the spring is to maintain the harp at an inclination or in the position as shown in Figs. 1 and 2. Connected to the upper end of the extension 17, as at 34, is the base 35, of a guard yoke 36. The arms of the guard yoke 36 project around the stem 23 for projecting the same.

The harp can swivel upon the collar 21, in view of the fact that the stem 23 is loosely mounted in the collars 21, 22, and the arm 19 swings upon its pivot 20 when occasion so requires against the action of the upper end of the spring 32. Not only does the spring 32 have a tendency to maintain the trolley wheel 26 in engagement with the trolley wire 27, but the spring 13 also acts to maintain the trolley wheel 26 in engagement with the wire 37.

What I claim is:—

1. A trolley wheel mount comprising a pole, a curved supporting arm having a bifurcated lower end pivotally connected to the upper portion of the pole, a spring having one end connected to the pole and its other end bearing against the bifurcated lower end of said supporting arm, a stem loosely connected to the upper end of said arm, a harp integral with the upper end of the stem, and a trolley wheel journaled in the harp.

2. A trolley wheel mount comprising a pole, an extension secured to the upper end of the pole, a supporting arm having a bifurcated lower end pivotally connected to said extension, a spring having its lower end attached to the pole and its upper end engaging the bifurcated end of said arm, a pair of collars integral with the upper end of said supporting arm, a stem journaled in said collars, a harp integral with said stem, and a trolley wheel journaled in the harp.

3. A trolley wheel mount comprising a normally inclined harp provided with a stem, a trolley wheel journaled therein, a pair of bearing collars for said stem, means for preventing upward movement of the stem, a curved supporting arm integral at its upper end with said collars and having a bifurcated lower end, an extension projecting below said bifurcated lower end, means for pivotally connecting said bifurcated lower end to said extension, a pole having said extension connected thereto, and a spring connected to the pole and engaging said bifurcated lower end for normally maintaining said stem at an inclination.

4. A trolley wheel mount comprising a normally inclined harp provided with a stem, a trolley wheel journaled therein, a pair of bearing collars for said stem, means for preventing upward movement of the stem, a curved supporting arm integral at its upper end with said collars and having a bifurcated lower end, an extension projecting below said bifurcated lower end, means for pivotally connecting said bifurcated lower end to said extension, a pole having said extension connected thereto, a spring connected to the pole and engaging said bifurcated lower end for normally maintaining said stem at an inclination, and a guard yoke secured to the extension and through which extend said collars.

In testimony whereof I affix my signature in the presence of two witnesses.

WIKTOR FICZEK.

Witnesses:
PIOTR WIRNICK,
JOHN LEWANDOWSKI.